United States Patent
Gupta et al.

(10) Patent No.: US 10,685,042 B2
(45) Date of Patent: Jun. 16, 2020

(54) IDENTIFYING JOIN RELATIONSHIPS BASED ON TRANSACTIONAL ACCESS PATTERNS

(71) Applicant: Amazon Technologies, Inc., Seattle, WA (US)

(72) Inventors: Anurag Windlass Gupta, Atherton, CA (US); Timothy Andrew Rath, Des Moines, WA (US); Srinivasan Sundar Raghavan, Mercer Island, WA (US); Santosh Kalki, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 326 days.

(21) Appl. No.: 14/578,786

(22) Filed: Dec. 22, 2014

(65) Prior Publication Data

US 2016/0179921 A1 Jun. 23, 2016

(51) Int. Cl.
| | |
|---|---|
| *G06F 17/00* | (2019.01) |
| *G06F 16/28* | (2019.01) |
| *G06F 16/242* | (2019.01) |
| *G06F 16/2453* | (2019.01) |
| *G06F 16/27* | (2019.01) |

(52) U.S. Cl.
CPC .......... *G06F 16/282* (2019.01); *G06F 16/244* (2019.01); *G06F 16/24544* (2019.01); *G06F 16/275* (2019.01)

(58) Field of Classification Search
CPC ......... G06F 17/30498; G06F 17/30595; G06F 17/30581; G06F 16/275; G06F 16/2456
See application file for complete search history.

(56) References Cited

U.S. PATENT DOCUMENTS

| | | | |
|---|---|---|---|
| 5,675,714 | A | 10/1997 | Kato |
| 6,263,331 | B1 | 7/2001 | Liu et al. |
| 6,374,263 | B1 * | 4/2002 | Bunger ............. G06F 17/30451 |
| 7,620,615 | B1 | 11/2009 | Milby |
| 7,630,967 | B1 | 12/2009 | Srivastava et al. |

(Continued)

FOREIGN PATENT DOCUMENTS

| | | |
|---|---|---|
| AU | 2004258349 A1 | 1/2005 |
| CN | 102156933 A | 8/2011 |

(Continued)

OTHER PUBLICATIONS

International Patent Application No. PCT/US2015/067186; Int'l Search Report and the Written Opinion; dated Apr. 26, 2016; 10 pages.

(Continued)

*Primary Examiner* — Hasanul Mobin
(74) *Attorney, Agent, or Firm* — Davis Wright Tremaine LLP

(57) ABSTRACT

A corpus of information describing queries used to access a transactional data store may be used to identify analytical relationships that are not explicitly defined in a schema or supplied by a user. Join relationships may be identified based on field coincidence in elements of queries in the corpus. Join relationships may be indicative of dimensions and attributes of a dimension. Hierarchy levels for a dimension may be identified based on factors including data type, reference in an aggregating clause, and reference in a grouping clause.

21 Claims, 7 Drawing Sheets

(56) References Cited

U.S. PATENT DOCUMENTS

| | | | |
|---|---|---|---|
| 7,908,242 B1 | 3/2011 | Achanta | |
| 8,788,506 B1 | 7/2014 | Dornbach | |
| 2002/0188621 A1* | 12/2002 | Flank | G06F 16/5846 |
| 2004/0015471 A1* | 1/2004 | Netz | G06F 16/284 |
| 2004/0034616 A1* | 2/2004 | Witkowski | G06F 16/283 |
| 2004/0215626 A1 | 10/2004 | Colossi et al. | |
| 2005/0278357 A1 | 12/2005 | Brown et al. | |
| 2006/0020582 A1 | 1/2006 | Dettinger et al. | |
| 2007/0233644 A1* | 10/2007 | Bakalash | G06F 16/2455 |
| 2008/0010304 A1* | 1/2008 | Vempala | G06K 9/6224 |
| 2008/0027957 A1* | 1/2008 | Bruckner | G06F 17/30412 |
| 2008/0033907 A1 | 2/2008 | Woehler et al. | |
| 2009/0204566 A1 | 8/2009 | Barsness et al. | |
| 2009/0228433 A1* | 9/2009 | Aguilar Saborit | G06F 16/24556 |
| 2009/0271420 A1* | 10/2009 | Kusui | G06F 17/30598 |
| 2011/0055149 A1* | 3/2011 | Pimpale | G06F 16/283 707/602 |
| 2013/0013554 A1* | 1/2013 | Ortega | G06F 16/283 707/602 |
| 2013/0218353 A1 | 8/2013 | San Andres et al. | |
| 2013/0346429 A1* | 12/2013 | Bratz | G06F 16/25 707/758 |
| 2014/0181074 A1 | 6/2014 | Ghazal et al. | |
| 2014/0181827 A1 | 6/2014 | Dice et al. | |
| 2014/0258341 A1 | 9/2014 | Mazoue | |
| 2014/0279838 A1* | 9/2014 | Tsirogiannis | G06F 17/30292 707/603 |
| 2015/0039667 A1 | 2/2015 | Shah et al. | |
| 2015/0088925 A1* | 3/2015 | Pattabhiraman | G06F 16/2282 707/769 |
| 2015/0120684 A1 | 4/2015 | Bawaskar et al. | |
| 2015/0269178 A1* | 9/2015 | Rhodes | G06F 17/3089 707/700 |
| 2015/0363443 A1* | 12/2015 | Kaushik | G06F 16/221 707/723 |
| 2016/0019249 A1* | 1/2016 | Gunjan | G06F 17/30333 707/715 |

FOREIGN PATENT DOCUMENTS

| | | |
|---|---|---|
| CN | 102314633 A | 1/2012 |
| CN | 102890678 A | 1/2013 |
| CN | 103049556 A | 4/2013 |
| CN | 103631911 A | 3/2014 |
| CN | 103765935 A | 4/2014 |
| EP | 1804178 A1 | 7/2007 |
| JP | H09034759 A | 2/1997 |
| JP | H11003340 A | 1/1999 |
| JP | 2000353163 A | 12/2000 |
| JP | 2004086782 A | 3/2004 |
| JP | 2009523270 A | 6/2009 |
| JP | 2013542478 A | 11/2013 |
| WO | WO 2011/100076 A1 | 8/2011 |

OTHER PUBLICATIONS

International Patent Application No. PCT/US2015/067175; Int'l Search Report and the Written Opinion; dated Apr. 28, 2016; 9 pages.
Singapore Patent Application No. 11201705014T; Written Opinion; dated Sep. 28, 2017; 6 pages.
Australian Notice of Acceptance for Patent Application dated Jul. 31, 2018, Patent Application No. 2015369723, filed Dec. 21, 2015, 3 pages.
European Communication pursuant to Article 94(3) EPC dated Jul. 27, 2018, Patent Application No. 15848153.1, filed Dec. 21, 2015, 10 pages.
Japanese Decision to Grant dated Jun. 22, 2018, Patent Application No. 2017-533922, filed Dec. 21, 2015, 2 pages.
Japanese Office Action dated Jul. 2, 2018, Patent Application No. 2017-533917, filed Dec. 21, 2015, 3 pages.
Singaporean Notice of Eligibility for Grant and Examination Report dated Aug. 28, 2018, Patent Application No. 11201705014T, filed Dec. 21, 2015, 7 pages.
European Communication pursuant to Article 94(3) EPC dated Jan. 30, 2019, Patent Application No. 15823577.0, filed Dec. 21, 2015, 4 pages.
European Notice of Allowance dated Jan. 11, 2019, Patent Application No. 158481511, filed Dec. 21, 2015, 40 pages.
European Communication pursuant to Article 94(3) EPC dated Jun. 13, 2019, Patent Application No. 15823577.0, filed Dec. 21, 2015, 4 pages.
International Patent Application No. PCT/US2015/067175; Int'l Preliminary Report on Patentability; dated Jul. 6, 2017; 6 pages.
International Patent Application No. PCT/US2015/067186; Int'l Preliminary Report on Patentability; dated Jul. 6, 2017; 7 pages.
Chinese First Office Action dated Dec. 30, 2019, Patent Application No. 201580070304.8, filed Dec. 21, 2015, 5 pages.
European Communication pursuant to Article 94(3) EPC dated Dec. 10, 2019, Patent Application No. 15823577.0, filed Dec. 21, 2015, 7 pages.
Chinese First Office Action dated Mar. 23, 2020, Patent Application No. 201580069987.5, 14 pages.
Japanese Notification of Reasons for Refusal dated Feb. 12, 2020, Patent Application No. 2018-141008, filed Dec. 21, 2015, 4 pages.

* cited by examiner

IDENTIFYING JOIN RELATIONSHIPS BASED ON TRANSACTIONAL ACCESS PATTERNS

BACKGROUND

Data warehouse and online analytical processing ("OLAP") systems may include various tools that allow for the automated generation of analytical queries. These tools may, in some cases, rely on a user to supply various details concerning the structure of the data to be analyzed. Providing this information may, however, be an involved process. In other cases, tools may automatically generate analytical queries using explicitly defined schema information, such as primary key and foreign key relationships. However, analytically useful relationships may exist even when not explicitly defined. There may also be analytically useful relationships of which a user of an analytical tool is not aware.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Aspects of the present disclosure may be employed to identify join relationships that may be used to perform analytical operations on transactional data. Join relationships may be utilized to automatically generate analytical queries, such as those that may be used to generate hierarchies usable for analytics. Embodiments of the present disclosure may utilize query logs from a transactional data store, such as a relational database management system, to identify join relationships that are not explicitly identified by schema or metadata. Join paths may further be utilized to identify dimensions and associated attributes, and to identify hierarchies and other analytical relationships that may be formed from aggregations of the dimension attributes.

A system for identifying analytical relationships may comprise computing nodes communicatively coupled to a transactional data store. The computing nodes may comprise memories with instructions for receiving a transaction or diagnostic log containing queries used to access a transactional data store. By analyzing the corpus of query information contained in the log, embodiments may identify a dimension and attributes related to the dimension. The identification may be based at least partly on coinciding references to fields in the queries used to access the transactional data store. Fields with a relatively high frequency of coincidence may be selected as attributes related to a dimension. A level for a hierarchy associated with the dimension may be identified based on analyzing the corpus of query information for references to fields on which dimensions and associated attributes are based. Inclusion of such fields in aggregating clauses and grouping clauses may be suggestive of hierarchy levels and attributes that may be aggregated within a hierarchy. Data types of such fields may also be suggestive of hierarchy levels and attributes.

Figure 1:
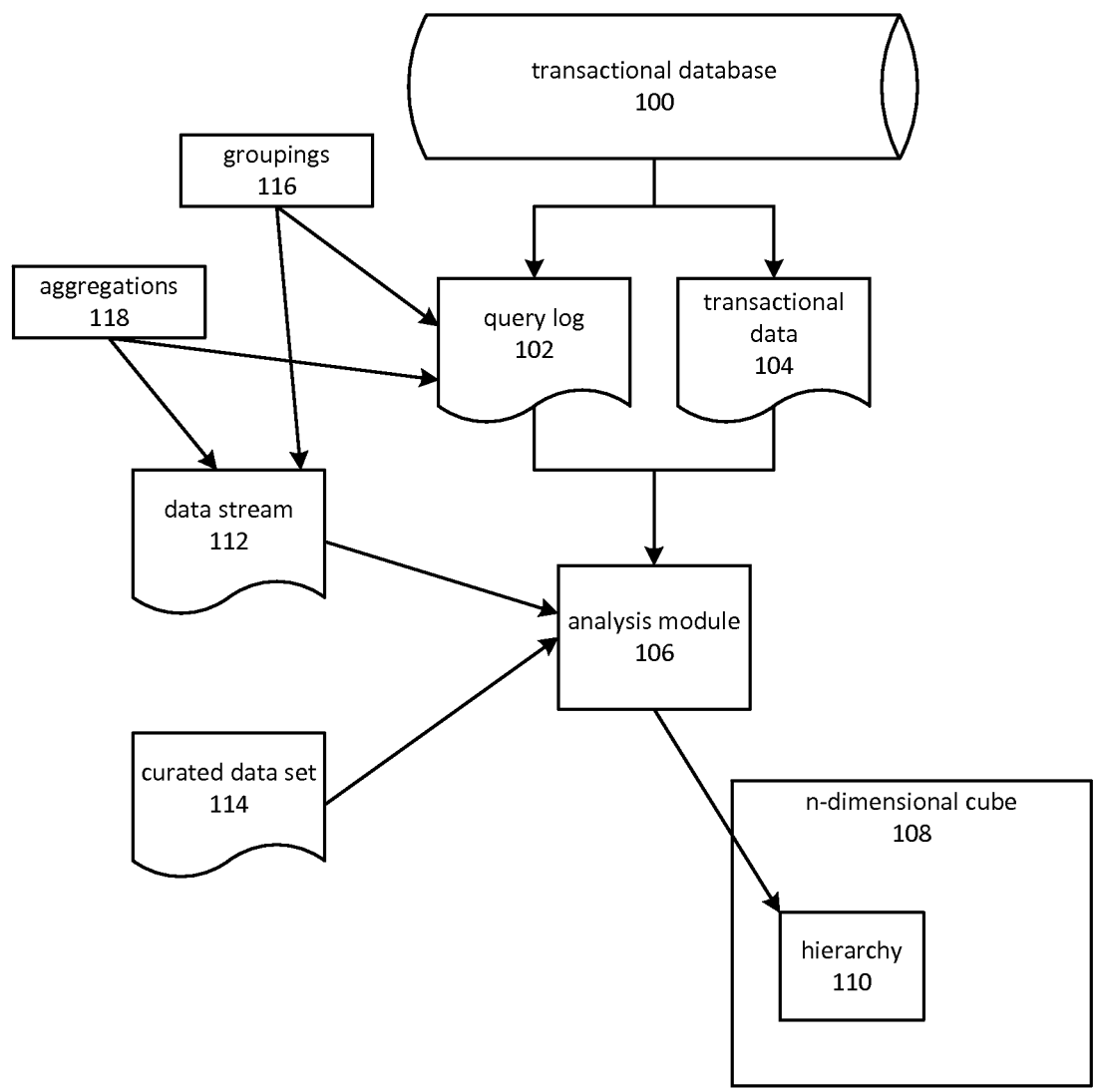
FIG. 1 is a block diagram depicting an embodiment of a system for performing automated detection of hierarchies and join paths based on patterns of accessing data in a transactional database management system.

FIG. 1 is a block diagram depicting an embodiment of a system for performing automated detection of hierarchies and join paths based on patterns of accessing data in a transactional database management system.

A transactional database 100 may include relational and non-relational database management systems. The term transactional is used herein to distinguish from data warehousing components that perform analytical functions, such as aggregating data, displaying hierarchies, forming inferences, identifying correlations, and so on. A transactional operation may include storing records, retrieving records, updating records, and inserting records. Accordingly, a transaction may be performed by a variety of systems, including but not limited to relational database systems, non-relational database systems, web services, point-of-sale systems, communications systems, and so on. Similarly, the term join path, as used herein, is not limited to relational database applications. A join path may refer to one or more attributes, features, or patterns in a dataset that may be used to logically relate the dataset to other data.

An analysis module 106 may comprise a component that is separate from transactional database 100, or a component that is integrated into transactional database 100. It will be appreciated that a database management system may support both transactional and analytical operations. In such cases, the transactional database 100 and analysis module 106 may be co-located. The depiction in FIG. 1 of transactional database 100 and analysis module 106 as separate entities may be seen as illustrative of general principles, and should not be viewed as limiting the scope of the present disclosure. An analysis module 106 may include components or systems that are separate from a transactional database 100. For example, analysis module 106 might comprise a data warehouse or a standalone online analytical processing system.

A transactional database 100 may, in the course of its operation, process various queries in order to store or retrieve data. Some or all of transactional data 104 processed by transactional database 100 may also be conveyed to, or obtained by, analysis module 106.

Information describing the operations performed by transactional database 100 may be recorded in a query log 102. In various embodiments, a query log 102 may comprise a sequential log file in which query text and parameters are recorded. In some embodiments, a transaction log may contain information indicative of queries processed by the system.

As used herein, the term data source may include various mechanisms by which data can be obtained, stored, or retrieved. Examples include, but are not limited to, a transactional database, a non-relational database, a relational database, a stream of information, a channel for information exchange, and so on.

As used herein, the term query may include textual or non-textual descriptions of commands processed by a transactional database in order to store, retrieve, update, or delete data. A query may, in some cases and embodiments, be expressed using a query language, such as structured query language ("SQL"). Other examples may include queries expressed through application programming interface ("API") calls, or as object graphs such as those used to express query language statements in binary form.

The information in query log 102 may be conveyed to, or obtained by, analysis module 106. Queries expressed in query log 102 may be analyzed, using various techniques described herein, to identify data relationships that are not explicitly described. The techniques include those based on aggregations 118 and groupings 116, which may be specified in the queries as aggregation functions or group by clauses, for example. Various database management systems, including relational, non-relational, NoSQL, key-value pair based, and so on, may all support similar means of performing aggregations 118 or groupings 116.

Transactional data 104 may be processed by analysis module 106 to further identify, refine, or validate relationships identified based on queries in query log 102. For example, analysis module 106 may identify a potential hierarchy using query log 102 and validate the potential hierarchy using transactional data 104.

Analysis module 106 may identify relationships based on queries expressed in query log 102 and cause those relationships to be incorporated into an n-dimensional cube 108. An n-dimensional cube 108 may include various structures used to represent multidimensional data aggregations used for analysis. An n-dimensional cube 108 may include various structures sometimes referred to as cubes, multi-dimensional cubes, hypercubes, pivot tables, and so on. An n-dimensional cube may be represented as a multidimensional index structure, and may further utilize sparse allocation structures.

As noted, analysis module 106 may identify a hierarchical relationship based on query log 102. This relationship may be stored in n-dimensional cube 108 as hierarchy 110. A hierarchy 110 may comprise aggregate values for various facts associated with a dimension. For example, unit sales amounts may represent a fact that may be incorporated into a hierarchy through a process of aggregation. For example, the lowest level of a hierarchy might contain daily unit sales, while the next level contains weekly unit sales, and so on. Embodiments may include an analysis module 106 that identifies a dimension as including the unit sales, and as being appropriately organized according to hierarchy levels based on time. A corresponding hierarchy 110 may be stored in n-dimensional cube 108 and used for analysis without necessarily involving manual configuration of n-dimensional cube 108 and/or hierarchy 110.

Analysis module 106 may identify hierarchical relationships in data based on inputs in addition to, or instead of, inputs coming from transactional database 100. These can include data stream 112 and curated data sets 114.

A data stream 112 may include a flow of data that is monitored and from which information concerning aggregations 118 and groupings 116 may be inferred. Aggregations 118 may comprise elements of the data stream that are indicative of various aggregation operations, such as summations, averages, and so on. Groupings 116 may comprise clusters of similar data, where similarity may be gauged by factors such as common data types, common semantic types, and so on. In some instances, data stream 112 may also be similar to query log 102 in that it may contain data indicative of queries or other forms of interaction between a consumer and a producer of data. In other words, embodiment may in some instances monitor request and reply patterns between applications and utilize the data to form inferences. This can include monitoring requests for data sent to a data source, and data returned from the data source in response to the requests.

Embodiments can also detect patterns in query log 102 and/or data stream involving repeated applications of transformation functions. For example, a function being frequently applied to the same set of data may be indicative of the two columns being related. A transformation function may also be suggestive of a possible aggregation. For example, if queries frequently calculate "counts" rather than "sums," this may be an indication that an aggregation in a hierarchy involving the same data should be made by calculating counts rather than sums.

A curated data set 114 includes collections of data containing collections of data useful for obtaining insights into hierarchies. For example, a curated data set 114 might comprise a mapping of corporations and the fiscal year calendar that each corporation has adopted. Another example is a mapping between zip codes and states.

Figure 2:
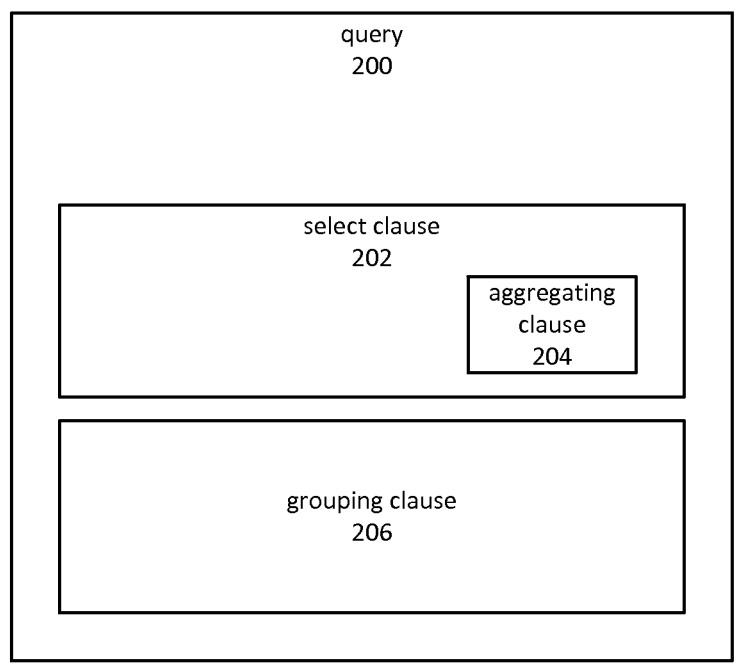
FIG. 2 is a block diagram depicting an example of a query comprising elements that embodiments may utilize in detecting join paths and hierarchies.

FIG. 2 is a block diagram depicting an example of a query comprising elements that embodiments may utilize in detecting join paths and hierarchies. In particular, FIG. 2 depicts an example involving a query used to identify records for retrieval, such as a SQL select statement. In various cases and embodiments, other query forms may be utilized. These may include, for example, insert, update, and delete statements.

As depicted n FIG. 2, query 200 may comprise various clauses such as 202 and 206. These may include select clause 202 and grouping clause 206. In various cases, additional clauses (not shown) may be included, and depicted clauses may be omitted.

A select clause 202 may include information indicating what fields should be returned in a query. This portion of a query may sometimes be referred to as a projection. In some cases, a select clause 202 may contain a list of fields that directly correspond to fields in transactional data, such as those that correspond to the values of columns in a table. In other cases, a select clause 202 may include various derived values, such as calculated fields or aggregated values. A select clause 202 may include a sub-clause to specify a derived value. For example, a select clause 202 may include an aggregating clause 204. An aggregating clause 204 may specify a calculation, such as a sum or average, which combines fields for a number of rows into a single value.

A grouping clause 206 may be specified to indicate how the rows specified by a query should be combined. A grouping clause 206 may be related to an aggregating clause 204. For example, a grouping clause may indicate that a result of query 200 should be grouped by month; in which case an aggregating clause 204 would result in monthly figures.

Embodiments may utilize the information contained in query 200 to infer or identify possible data relationships. These relationships may be identified and evaluated, as described herein.

The elements of a select clause 202 may be indicative of potential join relationships and candidates for inclusion in a dimension. In some cases, inclusion of two fields in a select clause 202 may indicate that the two fields are related. Explicit listing of two fields in a select clause 202 may indicate that the two fields are more strongly related than fields that, while belonging to the same row, are not explicitly included in a select clause 202.

Embodiments may identify fields included in an aggregating clause 204 in order to identify potential join relationships and candidates for inclusion in a dimension. For example, a unit sales value included in an aggregating clause 204 may be indicative of a sales dimension. Other fields specified in select clause 202 may be associated with the dimension. For example, a product name might be specified in select clause 202 along with an aggregating clause 204.

Embodiments may identify fields and criteria used to specify a grouping clause 206. The contents of a grouping clause 206 may be indicative of one or more levels of a hierarchy. The criteria by which an aggregate is grouped may correspond to a first level of a hierarchy, and may be indicative of additional levels above and below the first level. For example, a grouping clause that indicates a grouping by month might indirectly suggest grouping by quarter, year, or day. Embodiments may map from criteria specified in a grouping clause to possible sets of hierarchy levels. In the case of grouping by month, the grouping might map to a number of calendar-based hierarchies. Another example involves be geographic data, such as a grouping by city mapping to various hierarchies involving states, countries, regions, and so forth. Another example might involve a grouping by a business division suggesting hierarchies involving organizational structure. In some cases, an identifier from a system (such as a device identifier of a mobile phone) or a dataset may have an inferable join relationship with another dataset having an identifiable hierarchy. The inferred join relationship to the dataset may be used to map to the identified hierarchy.

Figure 3:
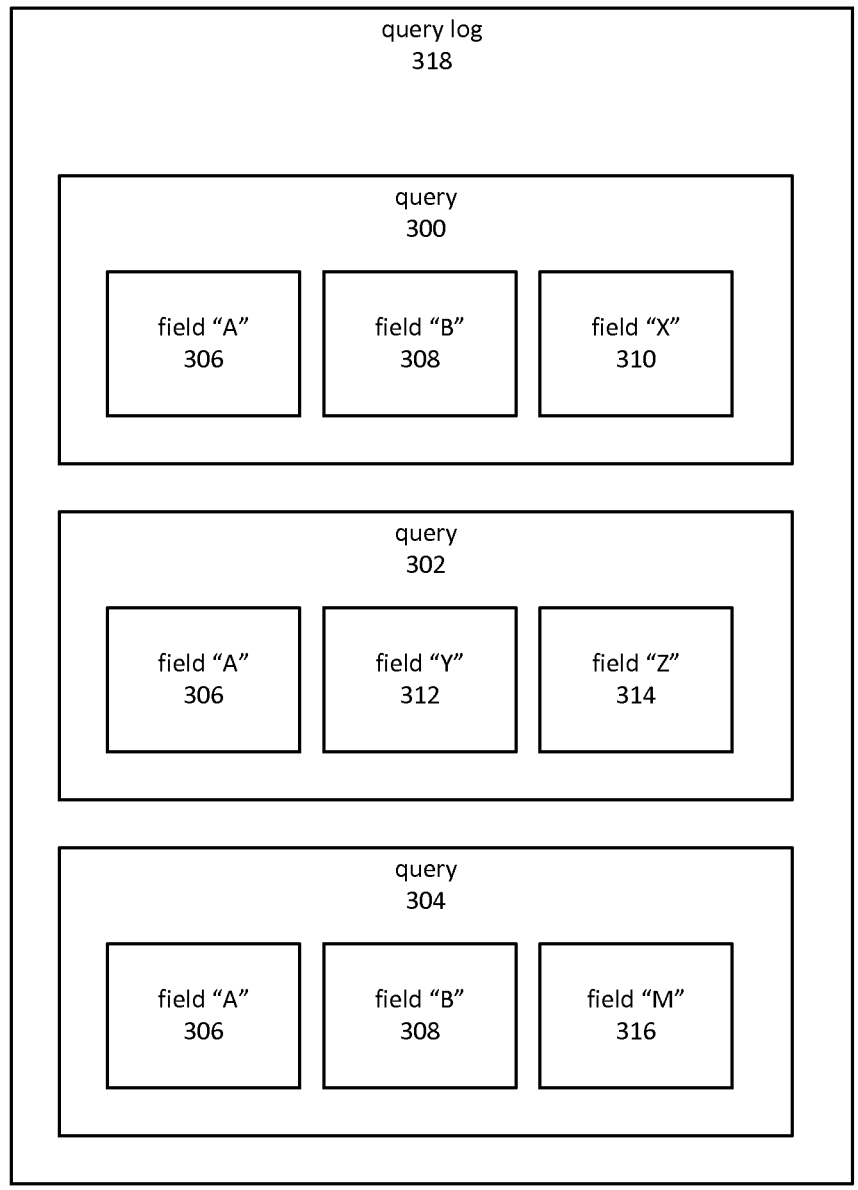
FIG. 3 is a block diagram depicting an example of a plurality of queries usable by embodiments to identify potential join relationships and dimensions based on repeated specification of coinciding fields.

FIG. 3 is a block diagram depicting an example of a plurality of queries usable by embodiments to identify potential join relationships and dimensions based on repeated specification of coinciding fields.

Information describing a plurality of queries 300-304 may be obtained through various means, such as from a transaction log, diagnostic log, and so forth. In FIG. 3, information describing queries 300-304 are depicted as being contained in query log 318. The information describing a plurality of queries 300-304 may be analyzed to detect coinciding fields. A coinciding field includes fields specified in the same query. This may include fields specified in the same select clause of a query, as well as fields occurring in different clauses. For example, two coinciding fields might comprise a first field in a select clause and a second field in a where clause, or a first field in a select clause and a second field in a group-by clause.

In FIG. 3, a query 300 may include references to field "A" 306, field "B" 308, and field "X" 310. Any two of these fields may be said to be coinciding. A second query 302 may also include field "A" 306, as well as field "Y" 312 and field "Z" 314. A third query 304 may include both field "A" 306 and field "B" 308, as well as field "M" 316. In query 300 and query 304, field "A" 306 is coinciding with field "B" 308. Accordingly, these two fields are more frequently coinciding than other fields indicated in queries 300-306. Based on the degree to which they coincide more frequently than other fields, referred to in queries 300-306, field "A" 306 and field "B" 308 may be considered more likely to be closely related, and therefore more likely as candidates for a join relationship or for association with a dimension.

Figure 4:
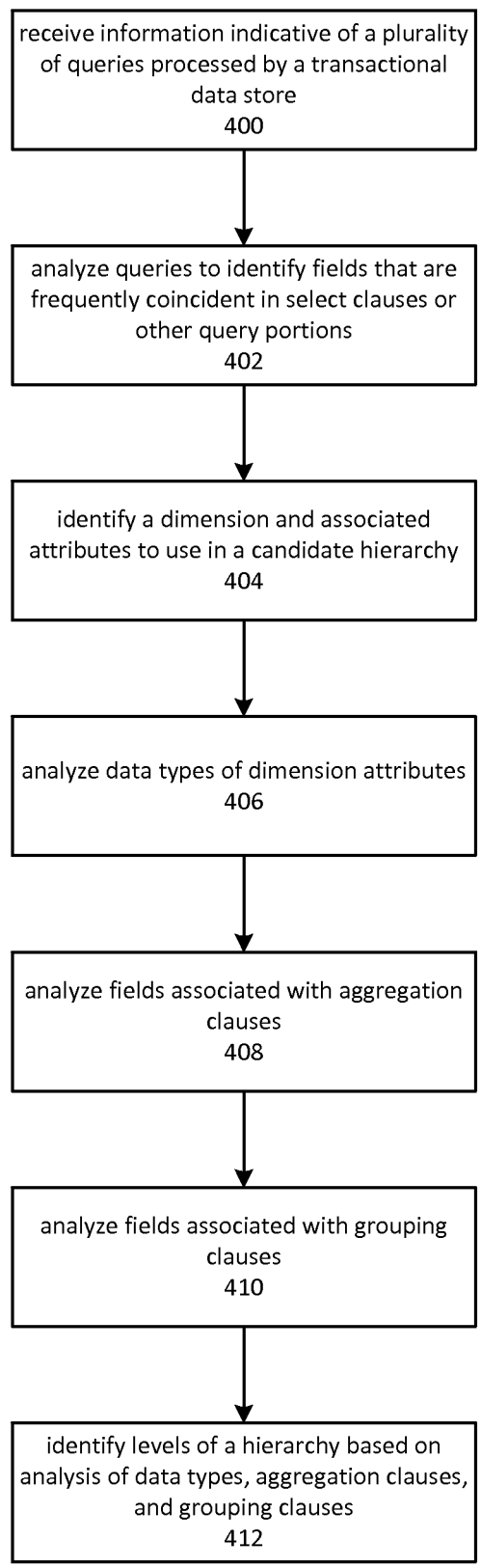
FIG. 4 is a flowchart depicting an embodiment of a process for forming a hierarchy based on identifying dimensions and levels in a plurality of queries processed by a transactional database system.

FIG. 4 is a flowchart depicting an embodiment of a process for forming a hierarchy based on identifying dimensions and levels in a plurality of queries processed by a transactional database system. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Element 400 depicts an embodiment receiving information indicative of a plurality of queries processed by a transactional data store. The plurality of queries may, for example, correspond to queries obtained from a log of operations performed by a database management system. These may be ordered temporally or provided in a summarized fashion. Embodiments may provide for mechanisms to filter the queries to be analyzed to a subset of those processed by a transaction data store or other system.

Element 402 depicts an embodiment analyzing queries to identify fields that are frequently coincident in select clauses or other portions of a query. Embodiments may statistically analyze queries to determine which fields occur together in the plurality of queries, and the relative frequency with which the fields coincide. Embodiments may, for example, form tuples of coinciding fields and associate each tuple with a count of the number of times that tuple has recurred. The tuples with the highest counts, or those tuples whose counts are above some threshold level, may be selected as candidate attributes for a dimension, or as being related to each other through a join path that is not explicitly defined in the transactional data store.

Embodiments may utilize the location of coincident fields within a query to identify potential paths and attributes for a dimension. For example, the coincidence of two fields within a select clause may be given a first weight, while coincidence of a field in a select clause with a field specified in a subquery may be given a second weight.

Element 404 depicts an embodiment identifying a dimension and attributes associated with the dimension for use in a candidate hierarchy. The dimension and associated attributes may be based on the degree to which fields are coincident within the queries obtained from the log. As noted, embodiments may base candidate dimensions and associated attributes on the relative degrees or counts of coincident fields, with those occurring most frequently being the most likely candidates.

Curated data sets may be employed to identify a dimension and attributes associated with the dimension. A curated data set may contain potential mappings between input data and various potential dimensions or attributes associated with the dimensions. The mapping may be based on information about the data such as its type, range, and value. For example, certain numbers might be inferred as zip codes based on falling within a certain value range, while a two-character alphabetic character such as "WA" might be inferred as being a state code.

Element 406 depicts an embodiment analyzing the data types of the attributes associated with the identified dimension. Embodiments may further refine potential join paths or candidate dimensions and attributes based on data type. For example, an integer data-type field is more likely to be a basis of a join path than a floating-point data type field. In addition, embodiments may associate certain data types with likely hierarchies. For example, date fields are commonly suggestive of hierarchy levels, while floating point fields may commonly be used as dimension values that may be aggregated.

Embodiments may identify a hierarchy level based at least in part on selecting a hierarchy from one or more hierarchies associated with the data type. Embodiments may include a mapping from various data types to hierarchies commonly associated with the data type. For example, a data type representing a date may be mapped to a plurality of potential hierarchies, such as a hierarchy based on the calendar year and a hierarchy based on a fiscal year.

Element 408 depicts an embodiment analyzing fields associated with aggregation clauses. Fields referred to in aggregation clauses may be candidates for a dimension that can be aggregated within a hierarchy. Similarly, as depicted by element 410, embodiments may analyze fields associated with grouping clauses to identify levels of the hierarchy.

Element 412 depicts an embodiment identifying levels of a hierarchy based on analysis of data types, aggregation clauses, and grouping clauses. This may comprise identifying a hierarchy level based at least in part on determining a frequency with which a field is associated with a grouping clause or an aggregating clause.

Note that the process described in FIG. 4 with respect to queries processed by a transactional data stream may also be applied to other data sources, such as a stream of data or an observed pattern of data exchange between applications. The operations depicted in elements 400-412 may be applied to these sources using an essentially similar process as the one that FIG. 4 describes.

Figure 5:
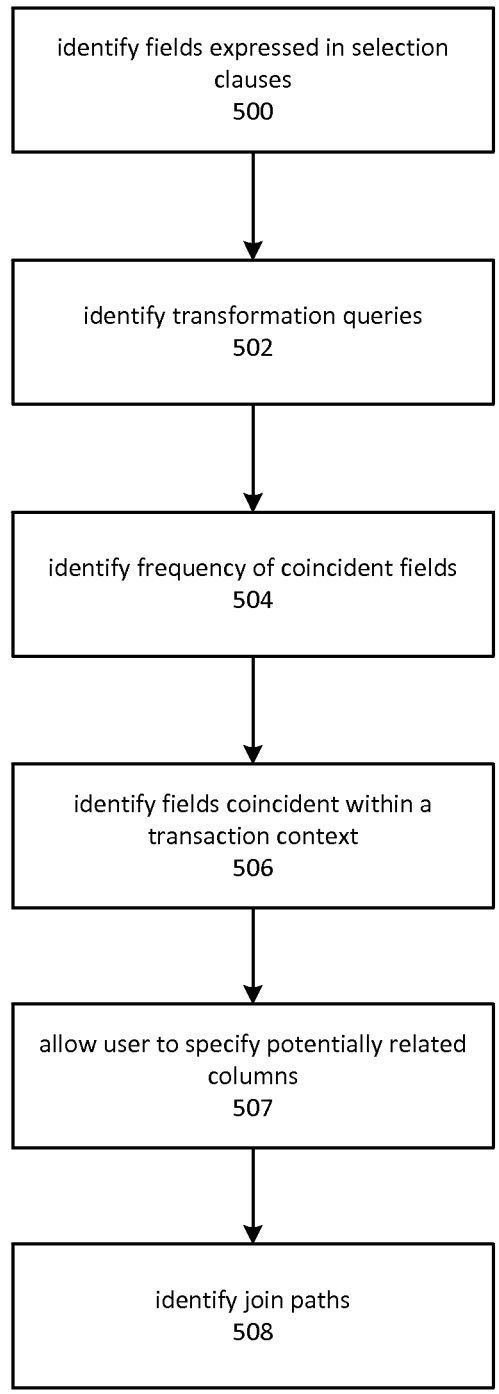
FIG. 5 is a flowchart depicting an embodiment of a process for identifying join paths based on transactional access patterns.

FIG. 5 is a flowchart depicting an embodiment of a process for identifying join paths based on transactional access patterns. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Element 500 depicts an embodiment identifying fields expressed in selection clauses in a corpus of information describing queries and other access patterns involving a transactional data store. The corpus of information may pertain to a log file obtained from a transactional data store, and may include transactional logs and/or diagnostic logs.

Element 502 depicts an embodiment identifying transformation queries in a corpus of information describing queries and other access patterns involving a transaction data store. This may comprise identifying one or more attributes for a dimension based at least in part on determining that a query represented in the corpus of information comprises a transformation from a first field to a value that corresponds to a fact. One non-limiting example involves a transformation from a geographic location to an identifier for a store that is located near the geographic location. Fields subject to such transformations may represent facts that may potentially be useful as attributes for a dimension.

Element 504 depicts an embodiment identifying a frequency with which fields are coincident within the corpus of information. This may include forming a count of a number of coinciding references to the one or more fields in the plurality of queries. The count may be compared to a threshold value to identify fields that may be suitable for use as an attribute for a dimension.

Element 506 depicts an embodiment identifying fields that are coincident within a transaction context. This may include identifying a dimension and one or more attributes associated with the dimension based at least in part on a coinciding reference to fields occurring within a transaction context. Fields updated in the context of a single transaction—or, in other words, as either committed or rolled back as a group—may be potentially related, implying a potential join path between the fields.

Element 507 depicts an embodiment allowing a user to specify potentially related columns. In some instances, user specification may take precedence over other factors in identifying potential join paths. In others, user specification of potentially related columns may be considered a factor to be used in combination with the other identified features of the corpus of information.

Element 508 depicts an embodiment identifying join paths based on the identified features of the corpus of information. A join path may be described as pertaining to relationships in a dataset that may not be explicitly expressed in the schema of the data. Join paths may be utilized to identify a dimension, attributes for the dimension, and hierarchy levels.

In an embodiment, a system for identifying analytical relationships in transactional data may comprise one or more computing nodes communicatively coupled to a transactional data store. The system may further comprise a memory bearing instructions that, when executed, cause the system to at least receive information indicative of a plurality of queries processed by the transactional data store, each query of the plurality of queries comprising one or more clauses; identify a dimension and one or more attributes associated with the dimension based at least in part on coinciding references to one or more fields in clauses of the plurality of queries, the one or more fields corresponding to the one or more attributes; and identify a level of a hierarchy, the level associated with the dimension by at least analyzing the plurality of queries for information indicative of a hierarchical organization of the one or more attributes, the information analyzed comprising a data type of a field of the one or more fields, a first association of the one or more fields with a grouping clause in the plurality of queries, and a second association of the one or more fields with an aggregating clause in the plurality of queries.

In an embodiment, a non-transitory computer-readable storage medium or computer program product may have stored thereon instructions that, upon execution by one or more computing devices, cause the one or more computing devices to identify a dimension and one or more attributes associated with the dimension based at least in part on coinciding references to one or more fields in a plurality of queries, the one or more fields corresponding to the one or more attributes; and identify a level of a hierarchy, the level associated with the dimension by at least analyzing the plurality of queries for information indicative of a hierarchical organization of the one or more attributes, the analyzed information comprising a data type of a field of the one or more fields, a first association of the one or more fields with a grouping clause in the plurality of queries, and a second association of the one or more fields with an aggregating clause in the plurality of queries.

In an embodiment, a computer-implemented method for identifying analytical relationships in transactional data may comprise identifying a dimension and one or more attributes associated with the dimension based at least in part on coinciding references to one or more fields in a plurality of queries, the one or more fields corresponding to the one or more attributes; and identifying a hierarchy level associated with the dimension by at least analyzing the plurality of queries for information indicative of a hierarchical organization of the one or more fields, the information analyzed comprising a data type, a field of the one or more fields, a first association of the one or more fields with a grouping clause in the plurality of queries, and a second association of the one or more fields with an aggregating clause in the plurality of queries.

Various embodiments may include aspects that involve identifying a hierarchy level based at least in part on selecting a hierarchy from one or more hierarchies associated with the data type.

In various embodiments, a data type may correspond to a time and the hierarchy comprising a plurality of levels, each level of the plurality corresponding to a period of time.

Various embodiments may include aspects that involve identifying a hierarchy level based at least in part on determining a frequency with which the one or more fields is associated with at least one of a grouping clause or an aggregating clause.

Various embodiments may include aspects that involve identifying the one or more attributes based at least in part on determining that the plurality of queries comprises a transformation from a first field to a value that corresponds to a fact.

In various embodiments, a coinciding reference comprises one or more fields in a select clause, the one or more fields corresponding to the one or more fields.

Various embodiments may include aspects that involve identifying the dimension and the one or more attributes associated with the dimension based at least in part on a coinciding reference to the one or more fields occurring within a transaction context in the plurality of queries.

Various embodiments may include aspects that involve determining a number of field values in a dataset that may be mapped to the hierarchy, the hierarchy comprising the dimension and the hierarchy level; and a ranking of the hierarchy based at least in part on the number of field values that may be mapped to the hierarchy.

The various aspects described herein may be combined in various ways to form alternative embodiments of a system, method, computer-readable medium, or computer program product. The various aspects mentioned herein are not mutually exclusive, except where explicitly indicated.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives.

Figure 6:
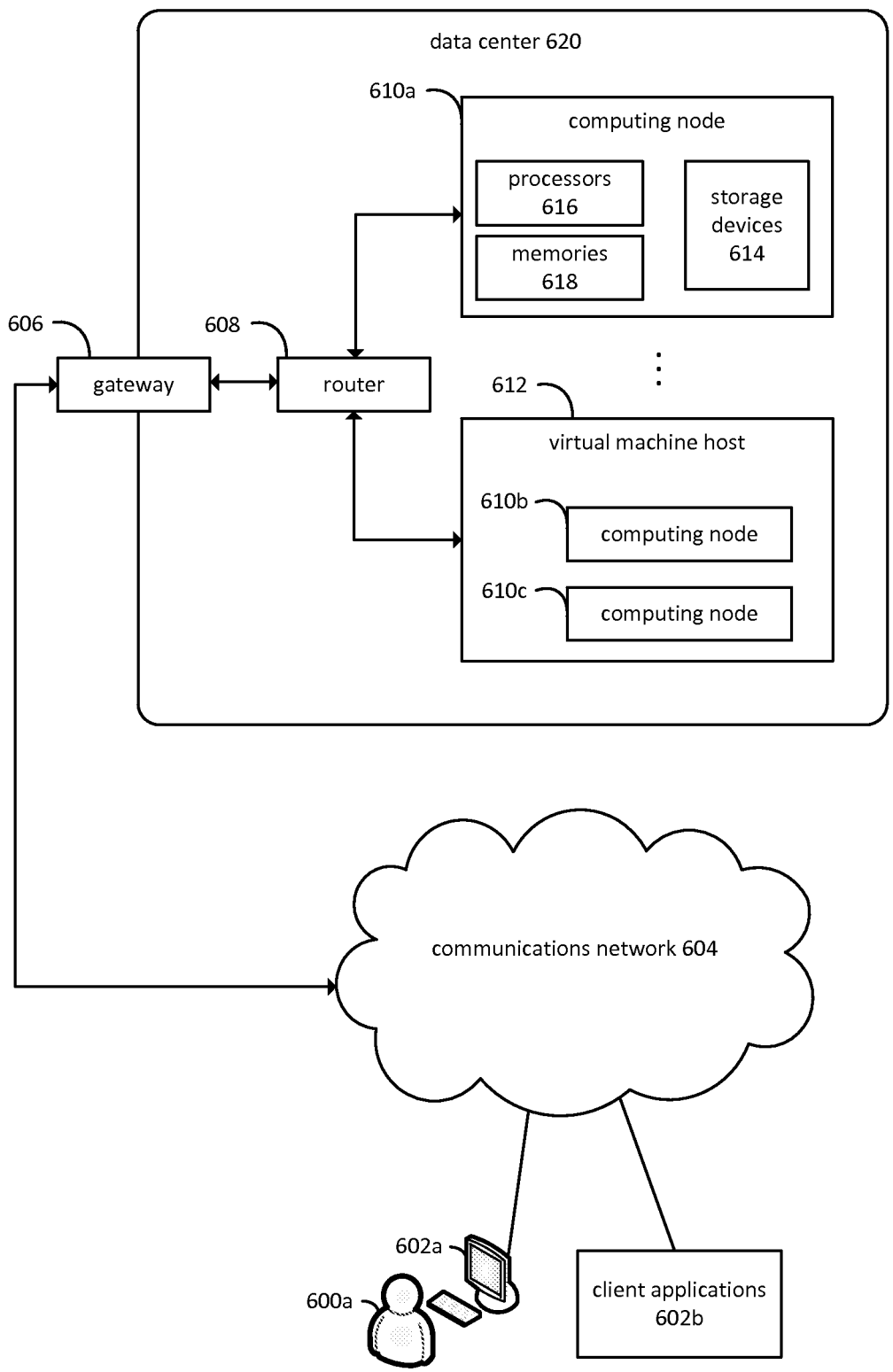
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620, may be provided via gateway 606 and router 608. Numerous other network configurations may also be employed. Although not explicitly depicted in FIG. 6, various authentication mechanisms, web service layers, business objects, or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618, and one or more storage devices 614. Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory, and storage devices. Any number of virtualization mechanisms might be employed to host the computing nodes.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
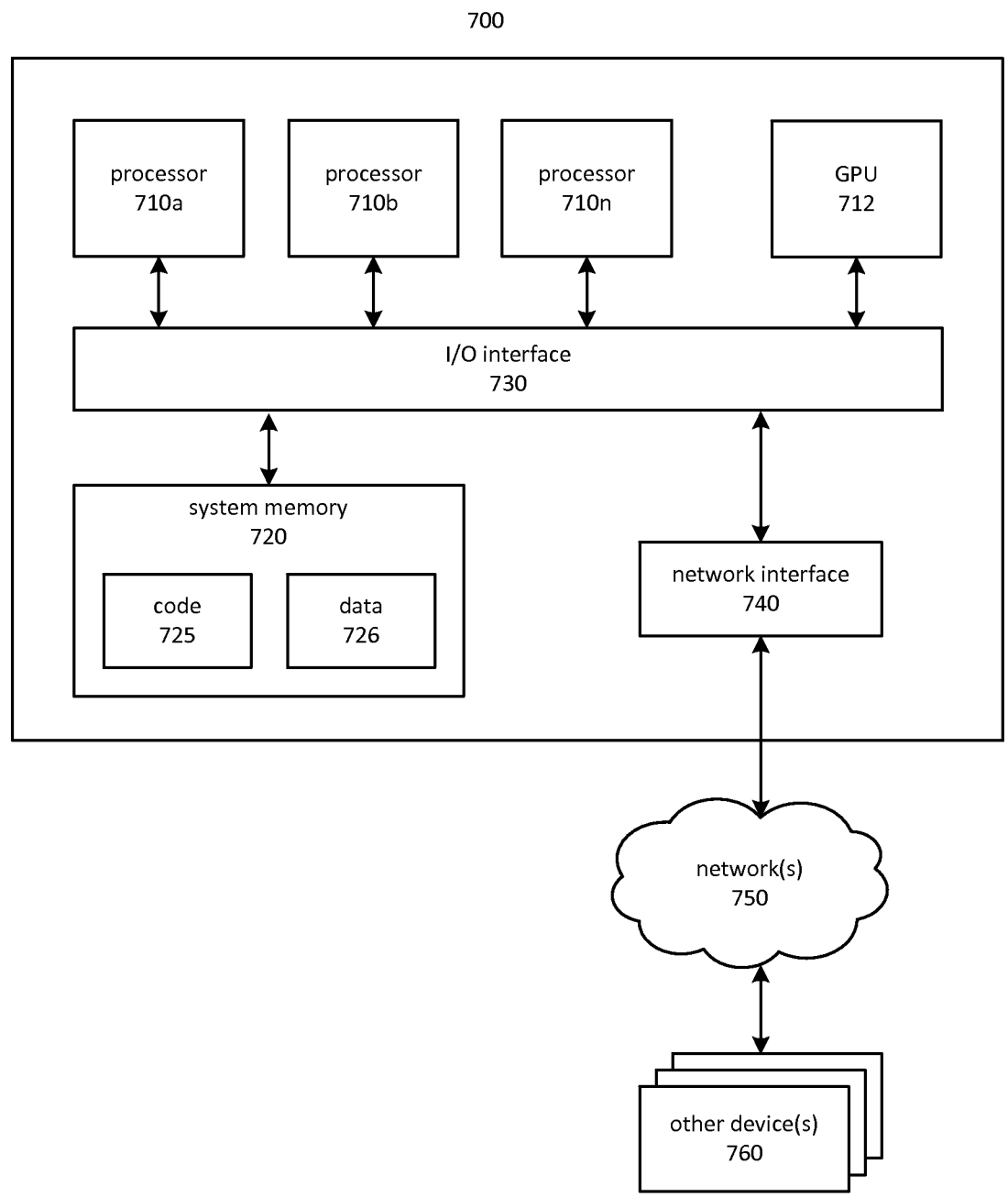
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output ("I/O") interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 610 may be general-purpose or embedded processors implementing any of a variety of instruction set architectures ("ISAs"), such as the x86, PowerPC, SPARC, or MIPS ISAs or any other suitable ISA. In multiprocessor systems, each of processors 610 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 610. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720, and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 610). In some embodiments, I/O interface 730 may include support for devices attached through various types of peripheral buses, such as a variant of the Peripheral Component Interconnect (PCI) bus standard or the Universal Serial Bus ("USB") standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for identifying analytical relationships in transactional data, the system comprising:
one or more memories having stored thereon computer-readable instructions that, upon execution by at least one processor, cause the system at least to:
receive information indicative of a plurality of queries processed by a database, the queries each comprising one or more clauses referring to fields of a table of a database;
identify at least two fields as dimensions of a potential hierarchy, the identification based at least in part on a count of a number of times a clause of a query of the plurality of queries includes references to each of the at least two fields;
identify a join path between the at least two fields based at least in part on the at least two fields reoccurring in a clause of a query of the plurality of queries;
identify a level of a hierarchy associated with the dimensions by at least analyzing the plurality of queries for information indicative of a hierarchical organization of the at least two fields in the join path, the information analyzed comprising at least one of a data type of a field of the at least two fields, a first association of the field with a grouping clause in the plurality of queries, or a second association of the field with an aggregating clause in the plurality of queries; and
form a hierarchy comprising the at least two fields and the level.

2. The system of claim 1, further comprising one or more memories having stored thereon computer-readable instructions that, upon execution by at least one processor, cause the system at least to:
select the level of the hierarchy based at least in part on a curated dataset comprising a mapping from the data type of the field to a hierarchy.

3. The system of claim 1, further comprising one or more memories having stored thereon computer-readable instructions that, upon execution by at least one processor, cause the system at least to:
identify the level of the hierarchy based at least in part on determining a frequency with which the field is associated with at least one of a grouping clause or an aggregating clause.

4. The system of claim 1, further comprising one or more memories having stored thereon computer-readable instructions that, upon execution by at least one processor, cause the system at least to:
identify the at least two fields based at least in part on determining that the plurality of queries comprises a transformation of one of the at least two fields.

5. A non-transitory computer-readable storage medium having stored thereon instructions that, upon execution by one or more computing devices, cause the one or more computing devices at least to:
identify at least two fields as dimensions of a potential hierarchy, the identification based at least in part on obtaining a count of a number of times a clause in a query of a plurality of queries includes a coinciding reference, the coinciding reference comprising references to each of the at least two fields in the plurality of queries;
identify a level of a hierarchy associated with the dimensions by at least analyzing the plurality of queries for information indicative of a hierarchical organization of the at least two fields, the information analyzed comprising at least one of a data type of a field of the at least two fields, a first association of the field with a grouping clause in the plurality of queries, or a second association of the field with an aggregating clause in the plurality of queries; and store a hierarchy comprising the at least two fields and the level.

6. The non-transitory computer-readable storage medium of claim 5, comprising further instructions that, upon execution by the one or more computing devices, cause the one or more computing devices to at least:

identify the level of the hierarchy based at least in part on one or more hierarchies associated with the data type.

7. The non-transitory computer-readable storage medium of claim 6, wherein the data type corresponds to a time and the hierarchy comprises a plurality of levels, each level of the plurality corresponding to a period of time.

8. The non-transitory computer-readable storage medium of claim 5, comprising further instructions that, upon execution by the one or more computing devices, cause the one or more computing devices to at least:

identify the level of the hierarchy based at least in part on determining a frequency with which the field is associated with at least one of a grouping clause or an aggregating clause.

9. The non-transitory computer-readable storage medium of claim 5, comprising further instructions that, upon execution by the one or more computing devices, cause the one or more computing devices to at least:

identify the at least two fields based at least in part on determining that the plurality of queries comprises a transformation of at least one of the at least two fields.

10. The non-transitory computer-readable storage medium of claim 5, comprising further instructions that, upon execution by the one or more computing devices, cause the one or more computing devices to at least:

identify the dimension and the at least two fields associated with the dimension based at least in part on a coinciding reference to the at least two fields occurring within a transaction context in the plurality of queries.

11. The non-transitory computer-readable storage medium of claim 5, comprising further instructions that, upon execution by the one or more computing devices, cause the one or more computing devices to at least:

determine a number of field values in a dataset that may be mapped to the hierarchy, the hierarchy comprising the dimension and the level of the hierarchy; and rank the hierarchy based at least in part on the number of field values that may be mapped to the hierarchy.

12. A computer-implemented method for identifying analytical relationships in transactional data, the method comprising:

identifying a join path for at least two fields of a potential hierarchy based at least in part on counting a number of times a clause of a query in a plurality of queries comprises references to each of the at least two fields, the join path indicative of a coinciding reference to the one or more fields occurring within a transaction context in the plurality of queries;

identifying a level of an aggregation associated with the join path by at least analyzing the plurality of queries for information indicative of a hierarchical organization of the at least two fields, the information analyzed comprising at least one of a data type of a field of the at least two fields, a first association of the field with a grouping clause in the plurality of queries, or a second association of the field with an aggregating clause in the plurality of queries; and storing a hierarchy comprising the level of the aggregation.

13. The computer-implemented method of claim 12, further comprising:

identifying the level of the aggregation based at least in part on a mapping between the data type and one or more aggregation hierarchies.

14. The computer-implemented method of claim 12, wherein the plurality of queries corresponds to queries represented in at least one of a log of operations performed by a database management system or a data stream.

15. The computer-implemented method of claim 12, further comprising:

identifying the level of the aggregation based at least in part on determining a frequency with which the field is associated with at least one of a grouping clause or an aggregating clause.

16. The computer-implemented method of claim 12, further comprising:

identifying at least one of the at least two fields to include in the join path based at least in part on determining that the plurality of queries comprises a transformation from a first field to a value.

17. The computer-implemented method of claim 12, further comprising:

forming a count of a number of coinciding references to the one or more fields in the plurality of queries.

18. The computer-implemented method of claim 12, further comprising:

identifying the join path based at least in part on receiving an indication, from a user, that the at least two fields are related.

19. The system of claim 1, wherein the data type corresponds to a time and the hierarchy comprises a plurality of levels, each level of the plurality corresponding to a period of time.

20. The non-transitory computer-readable storage medium of claim 5, comprising further instructions that, upon execution by the one or more computing devices, cause the one or more computing devices to at least:

identify a join path based at least in part on the coinciding reference to the one or more fields occurring within a transaction context in the plurality of queries.

21. The computer-implemented method of claim 12, wherein the query comprises one or more commands in a structured query language.

* * * * *